United States Patent [19]

Newman et al.

[11] Patent Number: 5,708,970
[45] Date of Patent: Jan. 13, 1998

[54] WIRELESS SOUND MONITORING APPARATUS WITH SUBAUDIBLE SQUELCH CONTROL

[75] Inventors: Perran V. L. Newman, Whittlesford, England; Theodore B. Freese, Westminster; Gary C. Lindenberger, Arvada, both of Colo.

[73] Assignee: Gerry Baby Products, Thornton, Colo.

[21] Appl. No.: 558,059

[22] Filed: Nov. 13, 1995

[51] Int. Cl.$^6$ ........................................ H04Q 9/02
[52] U.S. Cl. .................. 455/35.1; 455/79; 455/89; 455/212; 455/352; 340/539; 340/573; 340/692
[58] Field of Search ........................ 455/35.1, 36.1, 455/37.1, 67.1, 67.7, 79, 82, 83, 89, 90, 212, 350, 352, 355, 351; 340/573, 575, 539, 692

[56] References Cited

U.S. PATENT DOCUMENTS

| | | | |
|---|---|---|---|
| 3,810,023 | 5/1974 | Crowley et al. | 455/35.1 |
| 4,101,872 | 7/1978 | Pappas | 340/539 |
| 4,103,105 | 7/1978 | Akiyama et al. | 455/79 |
| 4,484,355 | 11/1984 | Henke et al. | 455/35.1 X |
| 4,598,272 | 7/1986 | Cox | 340/539 |
| 4,622,544 | 11/1986 | Bially et al. | 340/636 |
| 4,785,291 | 11/1988 | Hawthorne | 340/573 |
| 4,899,135 | 2/1990 | Ghahariiran | 340/573 |
| 4,996,717 | 2/1991 | Koening | 455/35.1 X |
| 5,119,072 | 6/1992 | Hemingway | 340/573 |
| 5,307,051 | 4/1994 | Sedlmayr | 340/573 |
| 5,534,851 | 7/1996 | Russek | 455/351 X |

Primary Examiner—Reinhard J. Eisenzopf
Assistant Examiner—Philip J. Sobutka
Attorney, Agent, or Firm—Robert G. Crouch; Chrisman, Bynum & Johnson, P.C.

[57] ABSTRACT

In a wireless sound monitoring system, ambient sounds are monitored by a microphone and transmitted over a phase or frequency modulated transmitter to a receiver. A sound actuated switch responsive to ambient sounds louder than a predetermined level turns the transmitter on and causes a hidden tone to be generated. A delay circuit caused the hidden tone to be terminated before the transmitter is turned off when the sound level decreases. In the receiver, a mute circuit responds to the hidden tone to control the output of a loudspeaker, and thus, the hidden tone prevents a squelch tail from being heard. The monitoring unit also includes a pulse generator to cause the hidden tones to be generated at regular intervals, but with short pulse widths. In the receiver, a mute delay circuit prevents the un-muting of the loudspeaker in response to these short pulses, but as long as the hidden tone pulses are detected within a predetermined period of time, a visual indicator, an LED, will light to show the proper operation of the system. Each hidden tone detected will cause the LED to blink momentarily; however, if the hidden tones are not detected, the LED will be extinguished and a distinctive audio tone will be generated to alert the user.

15 Claims, 11 Drawing Sheets

WIRELESS SOUND MONITORING APPARATUS WITH SUBAUDIBLE SQUELCH CONTROL

BACKGROUND OF THE INVENTION

This invention relates to a wireless remote sound monitor, such as a nursery monitor.

Wireless monitors, such as those used to monitor the sounds of a baby, typically include two components, namely, a monitoring unit and a receiving unit. The monitoring unit is placed near the child and includes a microphone for picking up the sounds made by the child and a transmitter for sending the audio sounds over a radio signal to the receiving unit, preferably a portable unit carried by the parent or supervising adult, which includes a loudspeaker. Either or both the monitoring unit and the receiving unit may be battery powered or they may be provided with a source of power from an external power adapter that is connected to a commercial power outlet.

In some monitoring devices, the user has the option of monitoring continuously, that is, to leave the transmitter on continuously, or to use a sound activation circuit, which causes the transmitter to broadcast only when the ambient sound level is above a predetermined threshold value. In either mode, even by listening carefully, one cannot always tell whether the system is operational. If the baby being monitored is silent and the nursery quiet, then the audio output from the receiver may not clearly reveal whether the equipment is operating properly.

There is clearly a need to provide a wireless monitoring system where the user can be reassured that the equipment is operating properly, even when there is no sound being generated at the monitored location.

SUMMARY OF THE INVENTION

The present invention is directed to a wireless sound monitoring system that includes means to provide the user with assurance that the system is operating properly.

In the monitoring unit, the transmitter may be operated either continuously, or in a vox or sound activation mode. In either mode, a hidden tone is generated both by the activation of a sound operated switch and by a pulse generator which turns on the hidden tone at regular intervals. The hidden tone in the present invention is a subaudible tone, typically below 150 Hz. In a vox mode of operation, the transmitter is controlled by the conventional vox circuit; both the hidden tone and the transmitter are turned on by the vox simultaneously, but a delay circuit is provided to turn off the hidden tone before the transmitter.

In the receiving unit, the hidden tone is detected and used in a squelch or mute circuit to control to control the passage of audio from the receiver to a loudspeaker. Thus, because the hidden tone is terminated before the transmitter is turned off, there will be no squelch tail heard over the loudspeaker.

The hidden tone is also used to control an alarm circuit. As long as the hidden tone is detected, an LED will be turned on; however, whenever the hidden tone fails to be detected for a predetermined period of time, the LED will be extinguished and a distinctive alarm tone will be sounded over the receiver loudspeaker. To provide additional user reassurance, the LED will be blinked each time the hidden tone is detected. Thus, the user is provided with two means for determining proper operation of the system: a blinking LED when the unit is operating properly, and an extinguished LED and a distinctive audio tone in the event of a failure to receive the hidden tones.

Because the hidden tone is use both as an indication that the equipment is operating properly and as a squelch or audio mute control, particularly when in the vox mode of operation, a mute delay circuit is employed in this invention. When the hidden tones are generated only by the pulse generator, the mute delay circuit prevents the passage of any audio to the loudspeaker. The mute delay circuit has a time delay which is slightly longer than the pulse width of those hidden tones that result from the operation of the pulse generator. Thus, those hidden tones are detected but the audio circuit is not un-muted. On the other hand, any sounds picked up by the microphone above a threshold level will also cause a hidden tone to be generated, but such hidden tones will be longer than the time delay, and thus the audio circuit will be un-muted and the ambient sounds near the monitoring unit's microphone will be heard.

It is therefore an object of this invention to provide an improved wireless sound monitoring system which incorporates a hidden tone squelch circuit to prevent squelch tails for being heard when the system is operated in a vox or sound actuated mode.

It is another object of this invention to provide an improved wireless sound monitoring system where a hidden tone is used both to control the muting of a loudspeaker and to provide a visual and audible alarm in the event the hidden tone fails to be detected for a predetermined period of time.

It is a further object of this invention to provide, in a wireless sound monitoring apparatus comprising a monitoring unit, said monitoring unit including a microphone for monitoring ambient sounds, a transmitter connected to said microphone for broadcasting said ambient sounds on a specified radio frequency, a sound actuated switch responsive to ambient sounds louder than a predetermined level for generating a first control signal for causing said transmitter to broadcast an ambient sounds modulated radio frequency signal, a receiving unit, said receiving unit including a receiver tuned to the radio frequency output of said transmitter, means within said receiver for detecting and converting the ambient sounds contained in said radio frequency signal into an audio output, the improvement comprising in said monitoring unit, a tone generator for generating a control audio frequency tone, a first switching circuit responsive to said first control signal for applying said control audio frequency tone to said transmitter; in said receiving unit, a tone decoder for detecting and converting said control audio frequency tone into a tone detect signal, and a clamp circuit response to said tone detect signal for muting the audio output of said receiver in the absence of said tone detect signal.

It a still further object of this invention to provide, inn a wireless sound monitoring apparatus comprising a monitoring unit, said monitoring unit including a microphone for monitoring ambient sounds, a transmitter connected to said microphone for broadcasting said ambient sounds on a specified radio frequency, a sound actuated switch responsive to ambient sounds louder than a predetermined level for generating a first control signal, a transmit control switch responsive to said first control signal for causing said transmitter to broadcast on said specified radio frequency, a receiving unit, said receiving unit including a receiver tuned to the radio frequency of said transmitter, and means within said receiver for detecting and converting the ambient sounds contained in said radio frequency signal into an audio output signal, the improvement comprising: in said monitoring unit, a tone generator for generating a control audio frequency tone, a first switching circuit responsive to said first control signal for causing an output from said tone generator to be applied to said transmitter immediately when said first control signal is generated, a first delay circuit for removing the output from said tone generator a first predetermined time after said first control signal is terminated, a second switching circuit responsive to said first control signal for turning on said transmitter immediately when said first control signal is generated, a second delay circuit for turning off said transmitter a second predetermined time after said first control signal is terminated, said second predetermined time being longer than said first predetermined time, a pulse generator circuit for providing a second control signal of a predetermined duration at regular intervals directly to said first and said second switching circuits for controlling the operation of both said tone generator and said transmitter without any time delay, in said receiving unit, a tone decoder for detecting and converting said control audio frequency tone into an tone detect signal, a clamp circuit for muting the audio output of said receiver in the absence of said tone detect signal, and a mute delay circuit responsive to said control audio frequency tone for delaying the application of said tone detect signal to said clamp circuit for a predetermined period of time, which is greater than the duration of said second control signal.

Other objects and advantages of the invention will be apparent from the following description, the accompanying drawings and the appended claims.

DESCRIPTION OF THE PREFERRED EMBODIMENT

Figure 1:
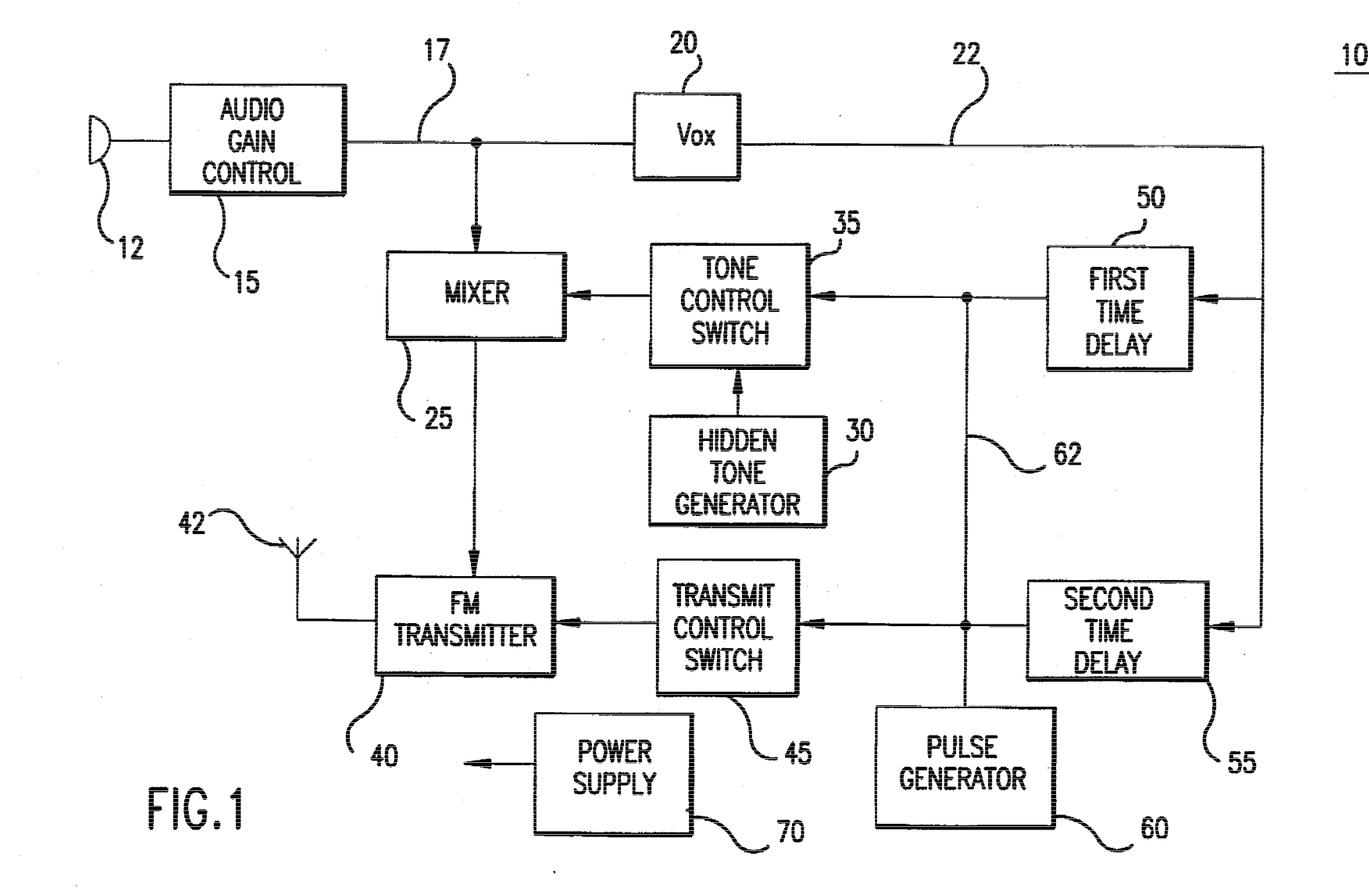
FIG. 1 is a simplified electrical block diagram of a monitoring unit employed in the wireless sound monitoring unit of the present invention.
Figure 2A:
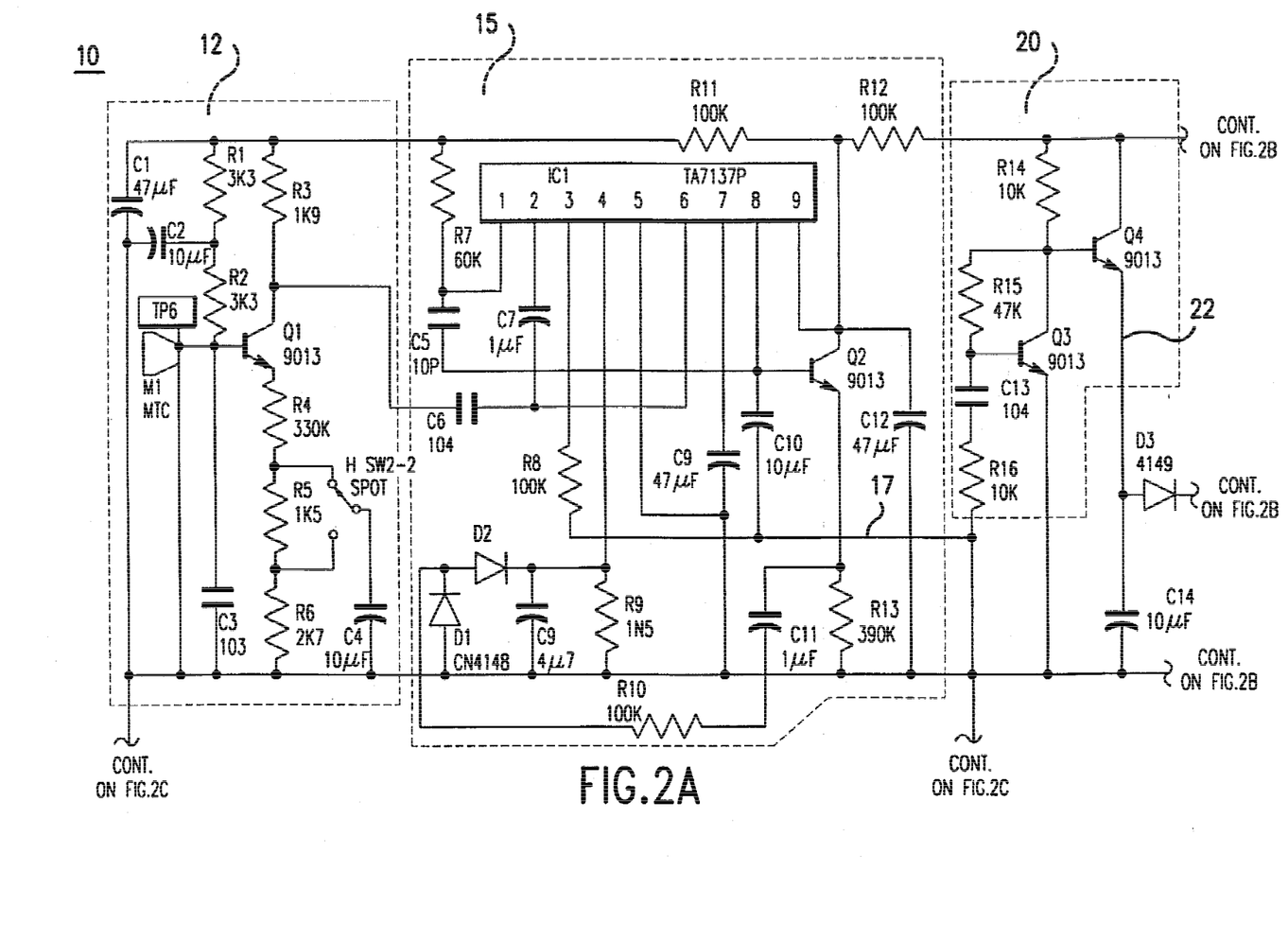
FIG. 2 is an electrical schematic diagram of the monitoring unit shown in FIG. 1.
Figure 2B:
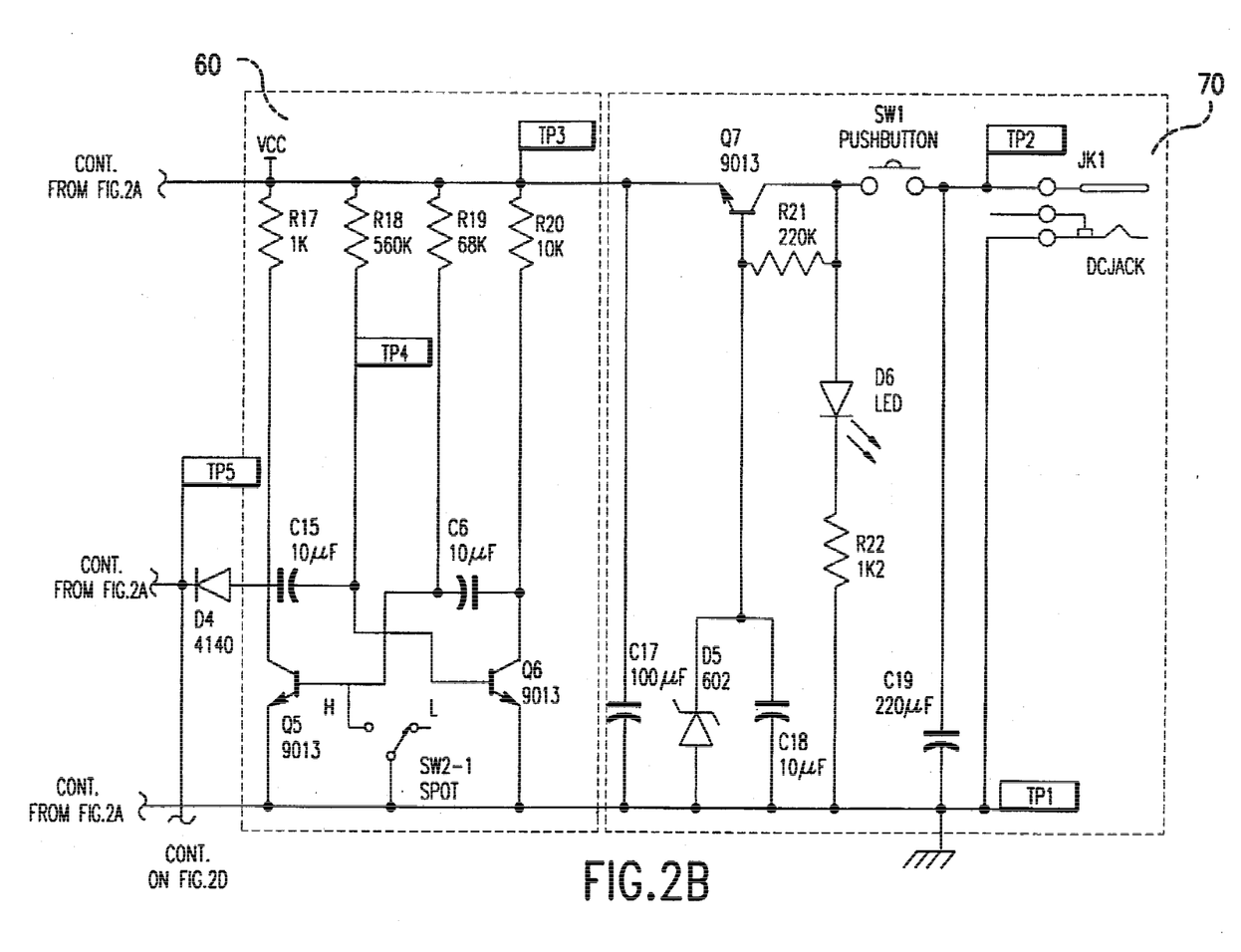
Figure 2C:
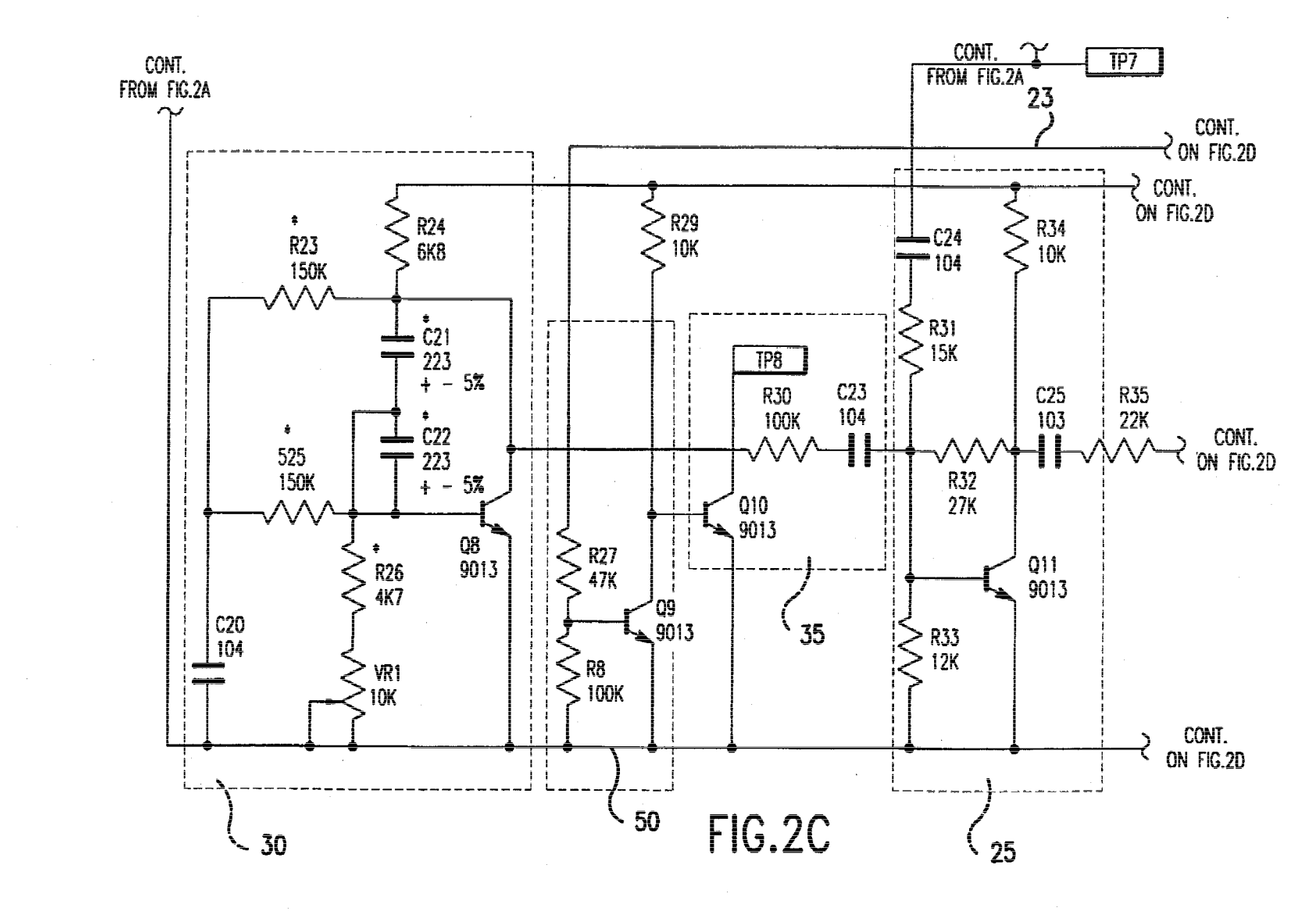
Figure 2D:
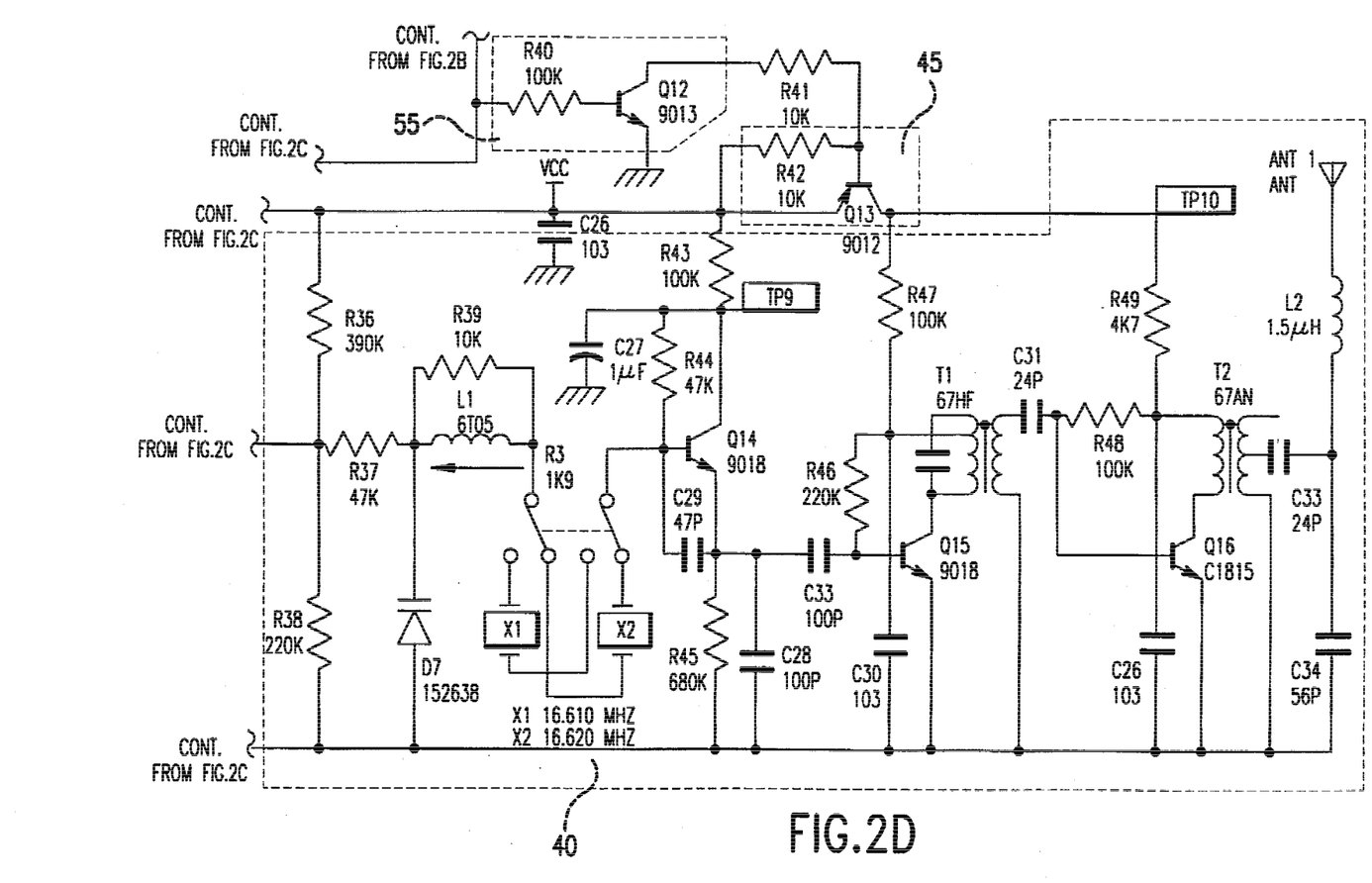

Reference is now made to the block diagram of FIG. 1 which illustrates a sound monitoring unit of the present invention. The sound monitoring unit 10 includes a microphone 12 which is connected to an amplifier and automatic gain control and amplifier circuit 15, the output of which on line 17 is applied to a sound or voice operated switch (Vox) 20 and to an audio mixer 25. The microphone monitors ambient sounds in the vicinity of the monitoring unit.

A hidden tone generator 30 generates a control audio frequency tone, which in the present invention is a subaudible tone, typically below 150 Hz, in the range of 90 to 100 Hz, and the output of this generator is sent through a first switching circuit or tone control switch 35 to the audio mixer 25. It is to be understood that the control audio frequency tone may also be a superaudible tone, that is, above normal audio but within the band pass of both the transmitter and receiver. The tone control switch either grounds the output of the tone generator or allows the tone to pass to the mixer 25. The output of the mixer 25 is applied to a frequency or phase modulated transmitter 40, which is of conventional design, and when the transmitter is turned on, it emits a modulated radio frequency signal on a specified radio frequency from antenna 42.

The output of sound switch or Vox 20 on line 22 is a first control signal that is applied through two time delay circuits, first time delay circuit 50 and second time delay circuit 55, to the tone control switch 35 and a second switching circuit or transmit control switch 45. The time delay circuits 50 and 55 do not affect the initial turn-on of switches 35 and 45. Thus, when a audio signal louder than a predetermined level is present at the microphone 12, as determined by the sound switch 20, a first control signal is generated on line 22, which causes both a tone control switch 35 and a transmit control switch 45 immediately to close to turn the transmitter on and also to provide the control audio frequency tone, along with the audio output of amplifier 15, to the transmitter, which is modulated with both audio outputs. In the preferred embodiment, both the transmitter and the control audio frequency tone are turned on simultaneously. In some circumstances, it may be desirable to have the transmitter on continuously.

When the ambient audio level falls below the threshold level, the first control signal on line 22 from the sound switch 20 is removed from time delay circuits 50 and 55. Time delay circuit 50 will time out before time delay circuit 55, thus causing the tone control switch 35 to open to remove the control audio frequency tone from the transmitted signal prior to the operation of time delay circuit 55, which will then turn off the transmitter 40.

A pulse generator 60 provides a second control signal on line 62 of a predetermined duration at regular intervals, typically a 0.6 second pulse every 5 seconds, to generate a reassurance tone. The output of the pulse generator 60 is applied directly to the tone control switch 35, which causes control audio frequency tones or tone pulses to be generated at regular intervals. At the same time, the transmit control switch 45 is pulsed so that both the control audio frequency tone and the transmitter are turned on and off at the same time. There is no time delay associated with the second control signal.

Referring now to the electrical schematic diagram of FIG. 2 wherein the various components of FIG. 1 have been identified with corresponding reference numerals. The microphone circuit 12 includes a microphone element M1 and an amplifier that includes transistor Q1. Switch SW2-2 is provided to control the gain of this circuit; when in the H position, the gain is high and when in the L position, the gain is low. This switch is coupled with a switch SW2-1 at the output stage of the pulse generator 60. This allow the user to monitor (1) continuously, by causing a steady state output on line 62, in which case the gain of the microphone is set high, or (2) to monitor only those sounds which are loud enough to exceed the threshold level set in Vox 20, in which case the gain of the microphone is set lower.

The tone control switch 35 includes transistor Q10, which either grounds the output of the tone oscillator 30 or allows the tone to pass into the mixer 25. Opening the tone control switch 35 means that the output of the hidden tone generator 30 is allowed to pass to the mixer 25.

First time delay circuit 50 includes capacitor C14 and a resistor divider network including resistors R27 and R28 and transistor Q9. The second time delay circuit 55 also includes capacitor C14 along with resistor R40, and transistor Q12. The values of these components are selected to cause the first time delay circuit 50 to open before circuit 55. The capacitor C14 is connected to line 23 through diode D3. Thus, the hidden tone will be removed from the transmitted audio prior to the transmitter being turned off. The transmit control switch 45 includes transistor Q13.

The pulse generator 60 is connected to the control line 23 through blocking diode D4, and thus capacitor C14 is not in the circuit and does not provide for any time delay when the second control signal is generated on line 62. Thus, as Q5 is gated on or off, a control pulse is sent on line 62 and through blocking diode D4 to line 23 to control the operation of both the transmit control transistor Q13 and hidden tone control transistor Q9 without any time delay.

The transmitter 40 is provided with at least two crystals as part of the frequency determining circuit. The fundamental frequency of the crystals X1 and X2 is tripled to provide an output at a specified radio frequency in the 49 MHz range. Audio modulation of the transmitter is accomplished through reactance modulation of the selected crystal.

Figure 3:
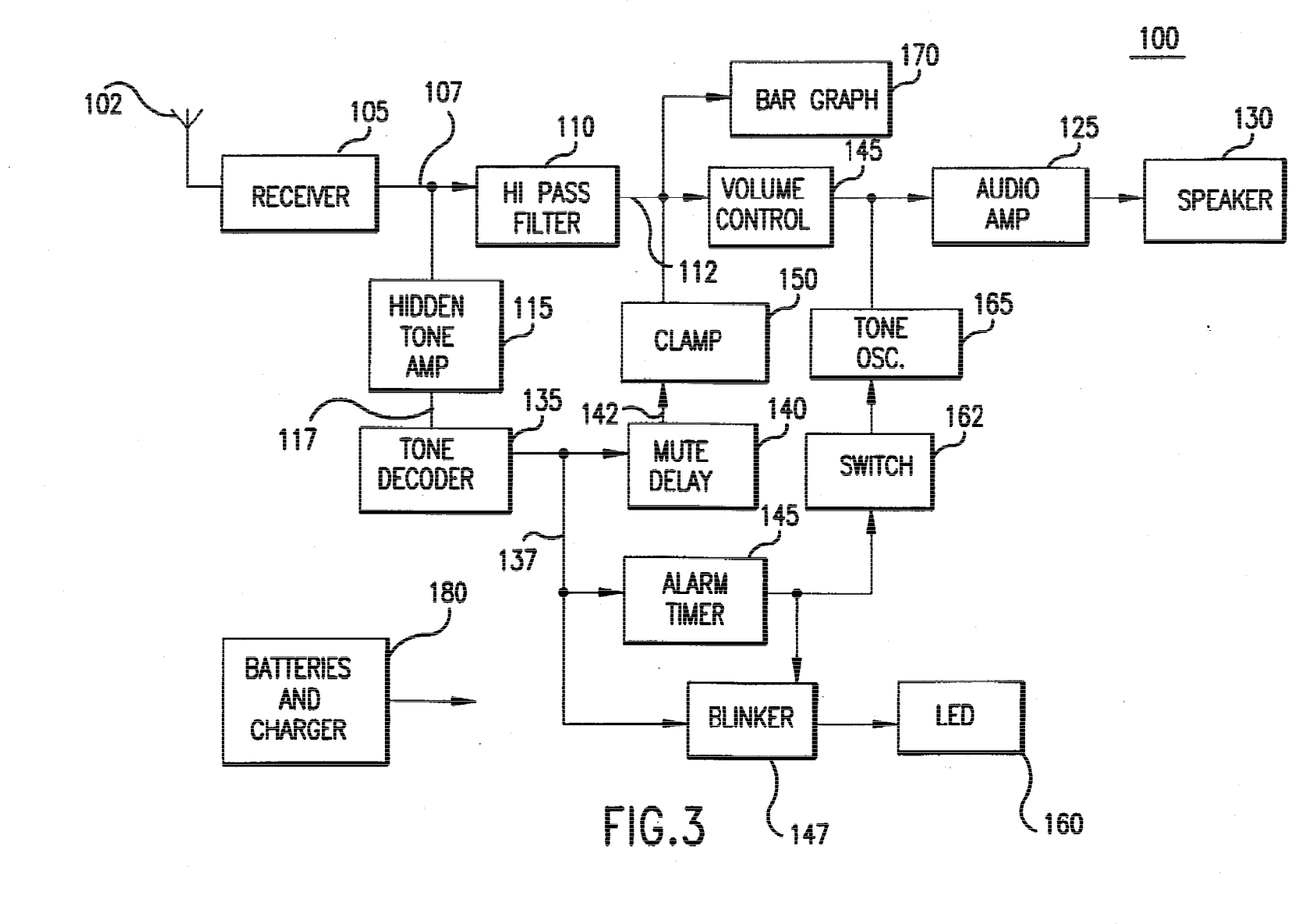
FIG. 3 is a simplified electrical block diagram of a receiving unit employed in the wireless sound monitoring unit of the present invention.
Figure 4A:
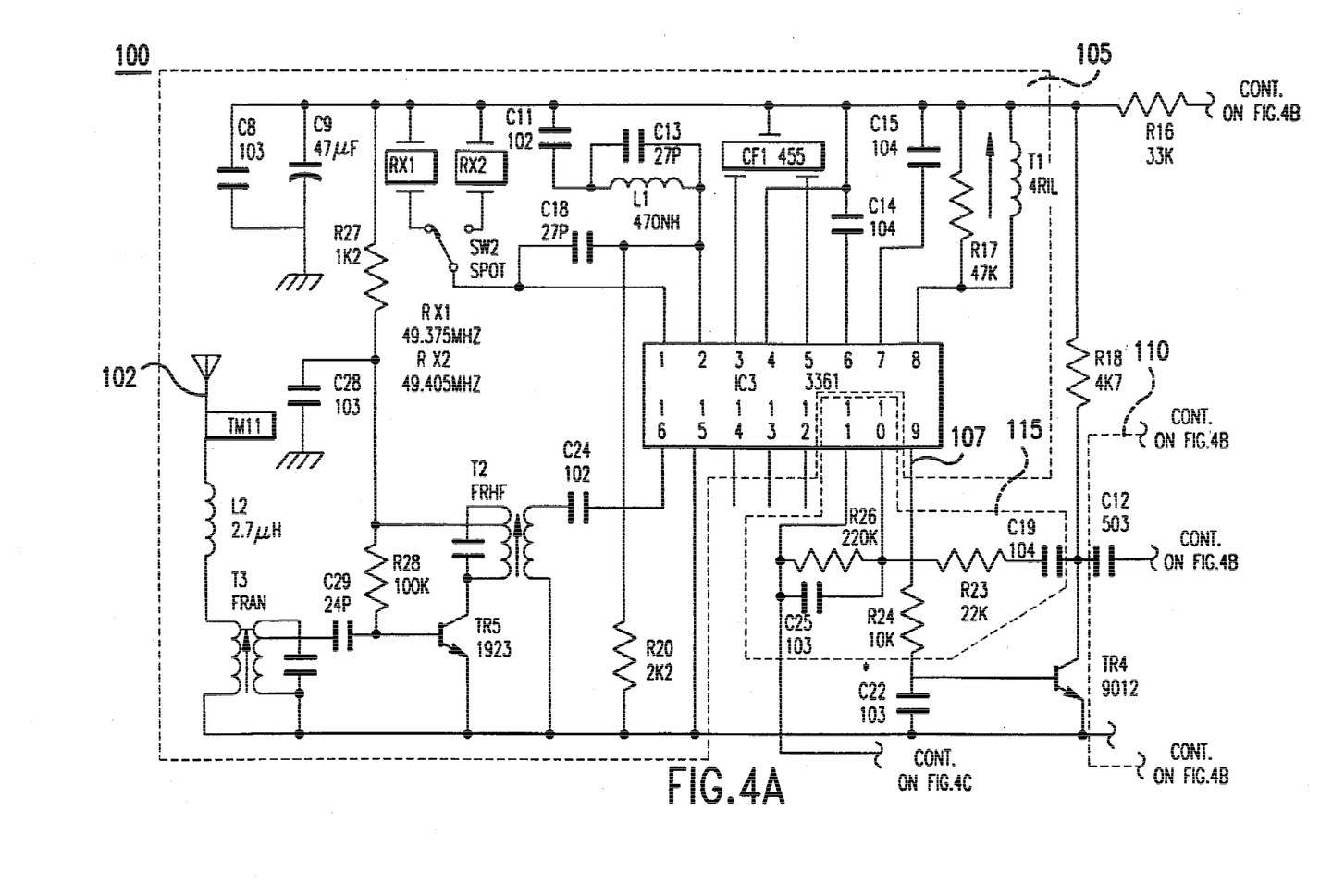
FIG. 4 is an electrical schematic diagram of the receiving unit shown in FIG. 3.
Figure 4B:
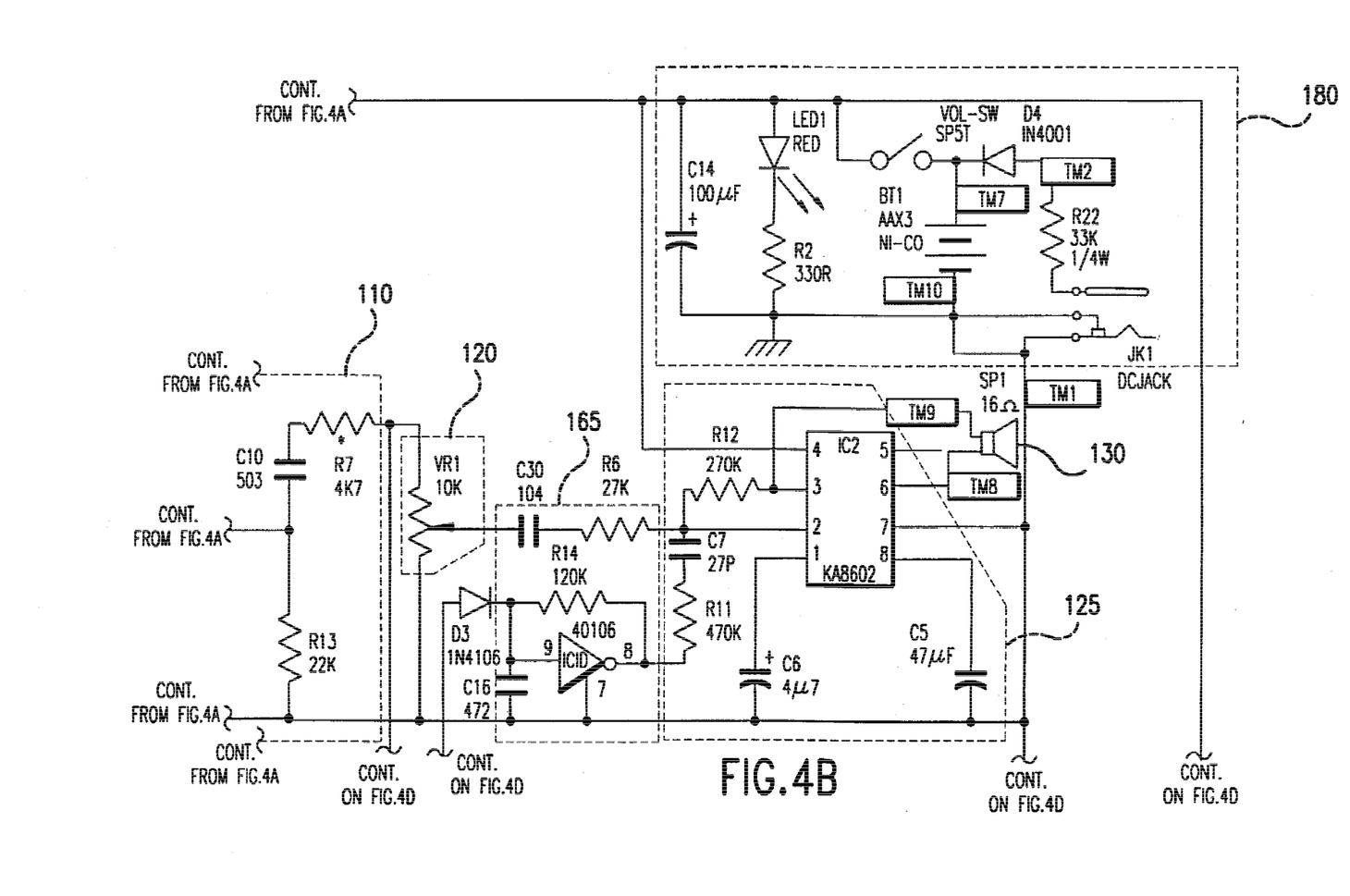
Figure 4C:
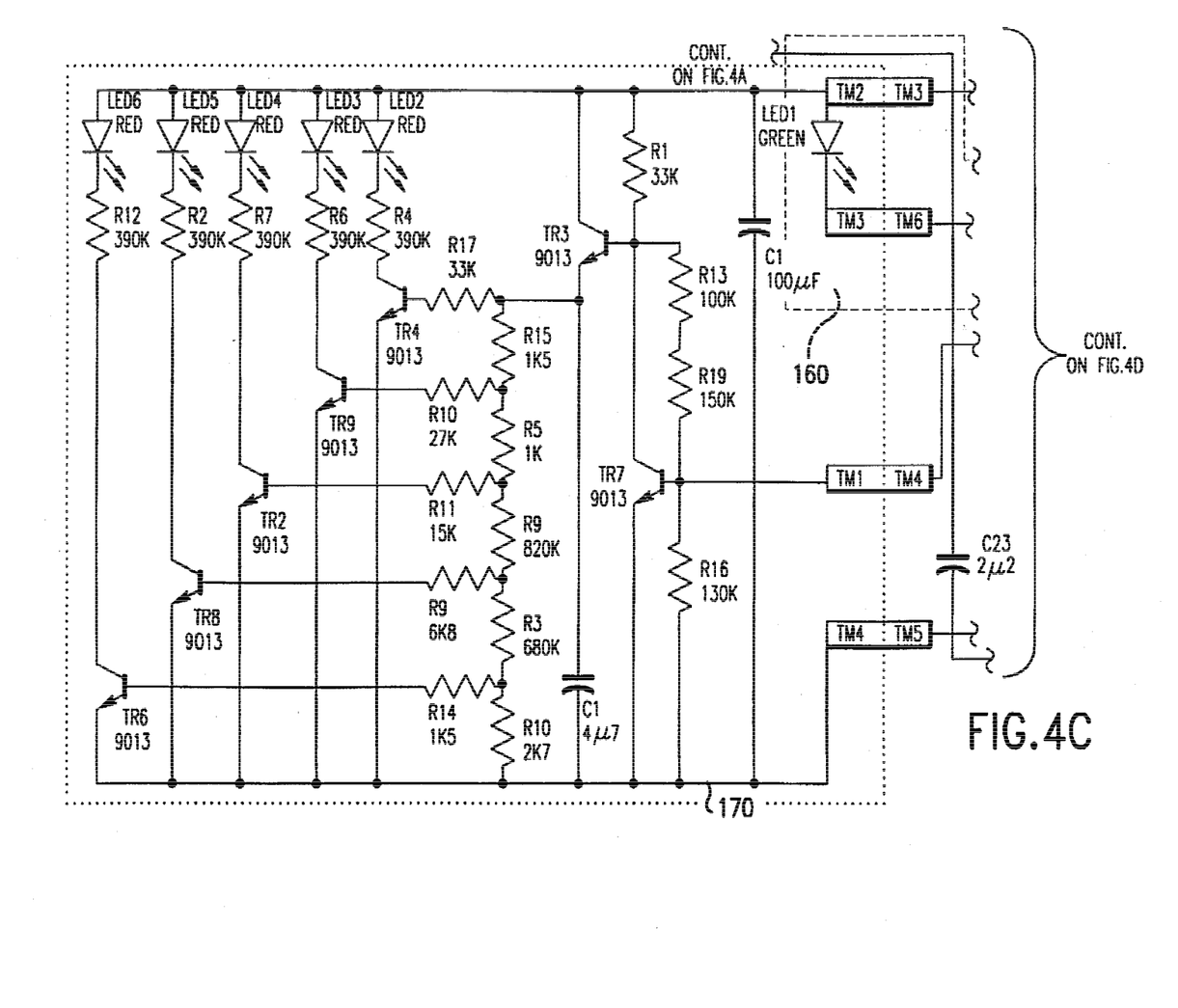
Figure 4D:
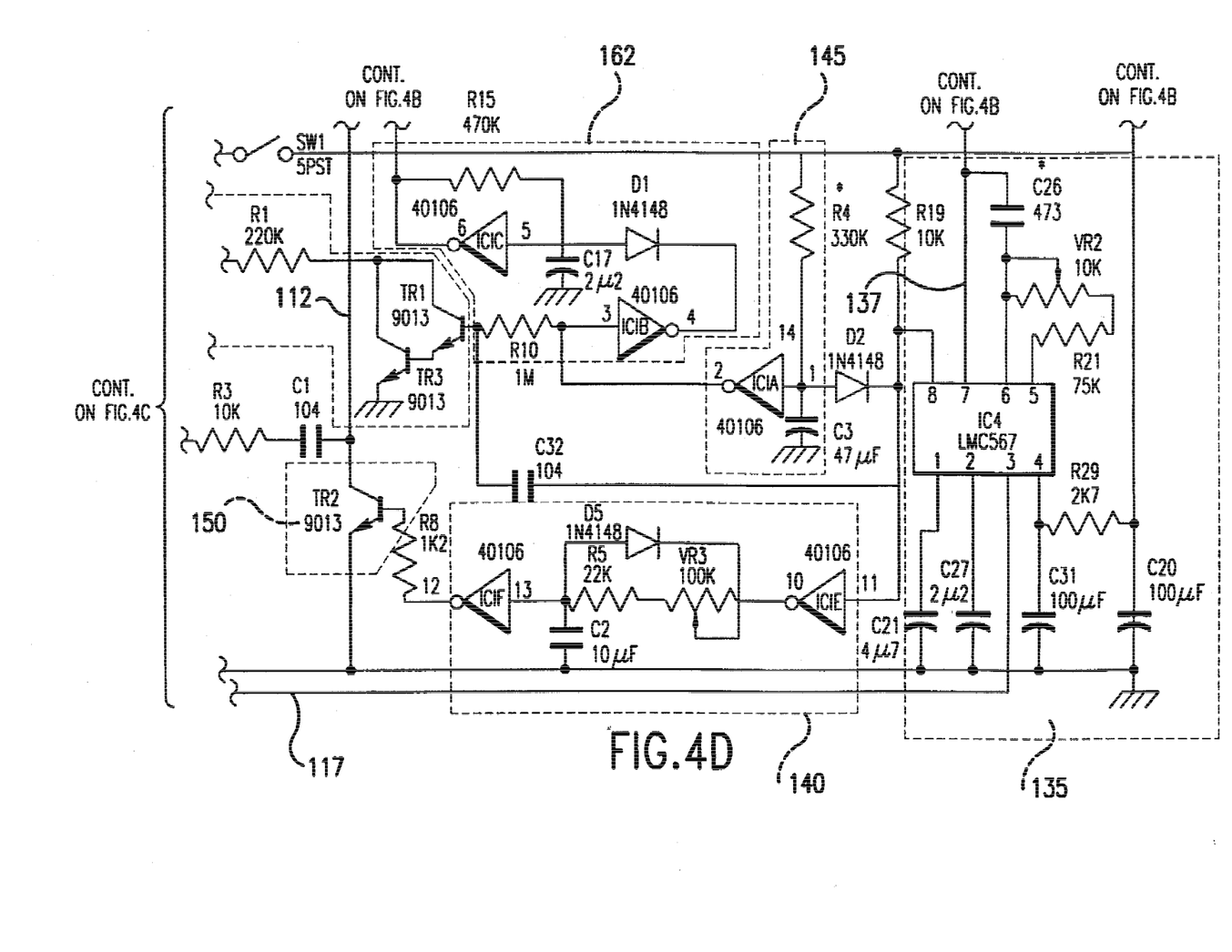

Referring now to FIG. 3 which is a simplified block diagram of a receiving unit 100, the radio frequency signal from transmitter 40 will be captured by an antenna 102 and directed to a conventional FM receiving circuit 105, the output of which is an audio signal on line 107, which is applied both to a high pass filter 110 and to a hidden tone (or subaudible tone) amplifier 115. The output of high pass filter 110 is applied through a volume control 120 to an audio amplifier 125, the output of which is a conventional loudspeaker 130.

The output of the hidden tone amplifier 115 on line 117 is applied to a tone decoder 135 which detects when a control audio frequency tone of the proper frequency is present on the transmitted signal. The output of tone decoder 135 on line 136 is applied to a mute delay circuit 140, an alarm timer 145 and a LED blinker circuit 147. The mute delay circuit 140 controls an audio clamp circuit 150 which in turn determines whether or not audio will be applied to the audio amplifier 125 and thus heard over the loudspeaker 130.

The alarm timer 145 is used to indicate whether the transmitter 40 and receiver 105 are functioning properly. Its output is applied through a switch 162 to a tone oscillator 165 which will provide a distinctive audio input to the amplifier 125, typically a pulsing high frequency tone.

An output of the alarm timer 145 also causes an LED 160 to light whenever the transmitter and receiver are functioning properly. An LED blinker circuit 147 causes a LED 160, which is placed on the receiving unit 100 to be observed by the user, to blink momentarily each time a reassurance tone is received. If the monitoring apparatus is functioning properly, the LED 160 will be on and occasionally blinking, but if the monitoring apparatus fails, then the LED will not be on, and a distinctive audio tone may be heard by the user over the loudspeaker 130.

The volume level of the ambient audio from microphone 12, as broadcast over transmitter 40, is visually presented on an LED bar graph 170, independent of the position of the volume control 120. The receiver 100 is provided with power from a power supply circuit 180 that includes batteries and a battery charger.

FIG. 4 is an electrical schematic diagram of the receiver unit 100 previously described in FIG. 3. The receiver uses a conventional integrated circuit receiver chip IC3, which is provided with a pair of frequency determining crystals RX1 and RX2 that allow reception of signals on either one of the two operating frequencies of transmitter 40 in the monitoring unit 10. The audio output from the receiver chip from pin 9 on line 107 is applied to two circuits: to a hidden tone amplifier 115, which includes an otherwise unused operational amplifier within the receiver chip, on pins 10 and 11; and also through high pass filter 110 and volume control 120 to a conventional audio amplifier 125.

The output of amplifier 115 is applied on line 117 to tone decoder 135, the primary component of which is IC4. The tone decoder is conventional and is designed to detect a control audio frequency tone, the hidden tone generated by tone generator 30 in the monitoring unit 10 (FIG. 1). Capacitors C21 and C27 determine the response time of the tone decoder while capacitor C6 and resistors R21 and VR2 determine its frequency. The output of the tone decoder is on line 137, pin 8 of IC4, is a tone detect signal which is grounded upon successful detection of the hidden tone. Because subaudible tones are used in the embodiment disclosed herein, there is an inherent short delay of approximately 300 to 400 milliseconds between the application of the hidden tone to the tone decoder 135 and the grounding of its pin 8; this is due to the nature of the tone decoder. If higher tone frequencies were employed, then the inherent delay would be shorter. The tone detect signal on line 137 controls the operation of three circuits, as previously explained: mute delay circuit 140, through blocking diode D2 to alarm timer 145, and LED blinker 147.

The mute delay circuit controls the operation of clamp 150, which includes transistor TR2. When a hidden tone is detected, transistor TR2 will open after a time delay of approximately one-half second, as determined by C2, R5 and VR3; when TR2 is open, the audio path between high pass filter 110 and the volume control 120 will not be grounded. Thus, no audio will be applied to the loudspeaker until a hidden tone is detected, causing line 137 to be grounded, and the time delay of circuit 140 has expired. Removal of the hidden tone will immediately cause the audio signal on line 112 to be grounded.

An alarm means is provided in the present invention for indicating when the control audio frequency tones are not properly received. The alarm timer 145 includes IC1A which is controlled by capacitor C3 and resistor R4. Each time a hidden tone is detected, capacitor C3 is grounded through blocking diode D2 and pin 8 of IC4. When the hidden tone is removed, the voltage level on C3 will increase, and when it exceeds a threshold detected by Schmitt inverter IC1A, tone oscillator circuit 165 will be energized which will impose an audio signal through capacitor C7 on the audio input to the audio amplifier 125. This will result in a distinctive warning tone being generated in the event that the hidden tone is not received at regular intervals, as will be explained.

The receiving unit 100 is also provided with an LED 160 which indicates the proper reception of the hidden tone. In the preferred embodiment, whenever the hidden tone is being received, the LED will be continuously on, but to provide reassurance that the unit is operating properly, the LED will be shut off momentarily each time a hidden tone is initially received. This will cause a brief blinking of the LED 160 whenever the unit is not otherwise receiving an audio signal from the microphone 12.

In operation, reception of a periodic hidden tone at the appropriate intervals will cause a continuous output signal from alarm timer 145 to be present at the pin 2 output of IC1A; this output is applied to Darlington amplifier TR1, TR3 which will cause the LED 160 to light. Each time a hidden tone is detected by the tone decoder 135, pin 8 of IC4 and line 137 will be grounded, causing capacitor C32 to impose a momentary negative going pulse at the base of transistor TR1 of Darlington amplifier, and this pulse will cause the LED 160 to blink off momentarily, for a fraction of a second, thus providing the user with the reassurance in the form of a visual indication that the hidden tones are being received on a regular basis.

Another feature of the present invention is a bar graph circuit 170 which has its input connected to the audio line 112. A set of five red LEDs represent the strength of the audio signal present on line 112.

Figure 5:
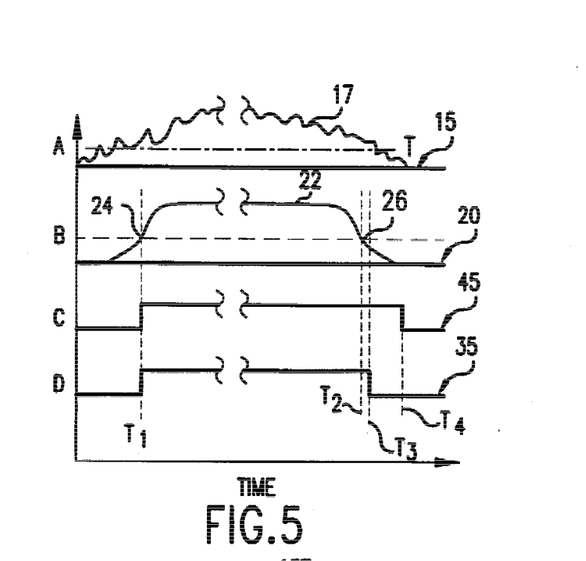
FIG. 5 is a set of waveforms showing the operation of several components within the monitoring unit of FIGS. 1 and 2 when the unit is responsive to ambient sounds.

FIG. 5 includes a set of waveform diagrams A to D which show the operation of several circuits within the monitoring unit 10 in response to detection of ambient sounds in the vicinity of the microphone 12. Waveform A shows the output on line 17 from the audio amplifier 15. As the ambient audio level detected or picked up by the microphone 12 becomes louder, it will eventually exceed a predetermined threshold value T, which cause the Vox circuit 20 to operate and create an output signal on line 22, as represented by waveform B. The output signal is applied through time delay circuits 50 and 55 to the transmit control switch 45 shown in waveform C, and the tone control switch 35, which operates as shown in waveform D.

As shown in FIG. 5, when the ambient audio sound level exceeds the predetermined threshold level, at point 24, both the control audio frequency tone and the transmitter carrier will be turned on at time T1. When the voice or audio level detected by the microphone 12 decreases, the voltage level on line 22 also decreases, and when it decreases to point 26, at time T2, the first time delay circuit 50 will operate to turn the tone control switch 35 off after a first predetermined time delay, which as shown is very short, and at time T3, the hidden tone is no longer applied to the transmitter. At time T4, which is later than T3, the transmit control switch 45 opens and the transmitter carrier is terminated.

Figure 6:
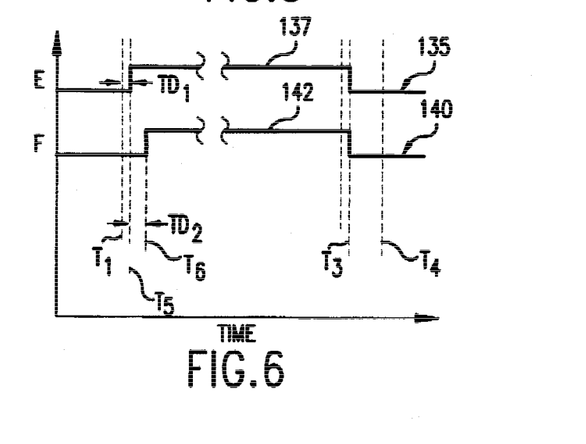
FIG. 6 is a set of waveforms showing the operation of several components within the receiving unit in response to the signals transmitted by the monitoring unit as in FIG. 5.

FIG. 6 includes a set of waveform diagrams showing the operation of the receiver 110 in response to the action of the monitoring unit 10. Waveform E shows the signal level on line 137, the tone detect signal from tone decoder 135. When the hidden tone is detected by the tone decoder 135 at time T5 in waveform E. which is a short delay TD1 after the receiver detects the hidden tone, an output on line 142 is generated by mute delay circuit 140 and applied to the clamp circuit 150. The time delay TDI is due to the inherent operation of the tone decoder chip IC4, as previously explained. Waveform F shows the output of mute delay circuit 140 on line 142; this circuit applies a time delay TD2 after the hidden tone is detected, and thus at time T6, the audio circuit is opened at time to allow the audio output of the receiver to be applied to the speaker 130. Thus, the system described is basically a tone actuated squelch circuit that has been provided with a delay circuit having a predetermined time delay value TD2.

When the hidden tone is terminated at time T3, the tone decoder 135 will mute the speaker, prior to the transmitter being turned off at time T4. Thus, no squelch tail will be heard in the speaker 130. This provides a truly quiet operation.

Figure 7:
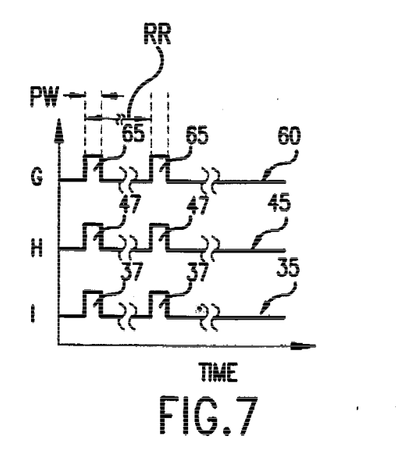
FIG. 7 is a set of waveforms showing the operation of several components within the monitoring unit in response to the operation of a pulse generator.

In addition to sound or voice actuation of the transmitter, the control audio frequency tone and the transmitter may be activated by a pulse generator 60 which generates second control signals at regular intervals. Referring to FIG. 7, waveform G shows the second control signals or pulses 65 which, in the preferred embodiment, have a pulse width PW and a pulse repetition rate RR of 5 seconds. The pulse width PW is less than one second, preferably in the order of 0.6 second. Waveform H represents an output 47 from the transmit control switch 45 and waveform I shows an output 37 from the tone control switch 35 (which represents a reassurance tone). Both outputs 37 and 47 follow the pulses 65 without any time delay.

Figure 8:
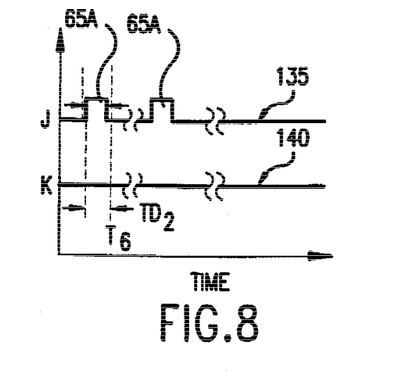
FIG. 8 is a set of waveforms showing the operation of several components within the receiving unit in response to the signals transmitted by the monitoring unit as in FIG. 7.

At the receiver 100, the second control pulses are detected as previously described and as depicted in FIG. 8. Waveform J shows that the detected pulses 65A will provide an output from the tone decoder 135; however, there will be no output from the mute delay circuit 140, as shown in waveform K. The mute delay time TD2 provided by mute delay circuit 140 is slightly greater than one second, and therefore, while the pulses generated by circuit 60 will be detected at the receiver, the receiver squelch or clamp 150 will not be opened, and therefore no audio will be presented at the speaker 130, unless, of course, the audio level at the microphone 12 is greater than the previously mentioned threshold value.

The pulses 65A are detected by the tone decoder 130, and applied to the alarm timer circuit 145. This circuit basically includes a capacitor and resistor R4 to form a RC time constant timing device. Each time a tone pulse is received, capacitor C3 is reset. If a pulse 65A is not received within a time period which slightly exceeds 20 seconds, then capacitor C3 will charge to a value which exceeds a threshold limit of IC1A, and a fault indication signal will be generated. Since tone pulses are generated by the monitoring unit at 5 second intervals, an alarm condition will be indicated only if four or more consecutive tone pulses are not detected by the tone decoder 135. Thus, the alarm timer circuit provides a means for indicating when more than a predetermined number of consecutive tone pulses are not properly received or detected.

There are two methods of indicating a fault or alarm condition. The first is through the use of an LED or indicator lamp 160. This lamp will be on as long as the tone pulses are received on a regular basis. The other is through a tone oscillator which will provide a distinctive beeping sound through the receiver speaker, independent of the volume control.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a wireless sound monitoring apparatus comprising
a monitoring unit, said monitoring unit including
    a microphone for monitoring ambient sounds,
    a transmitter connected to said microphone for broadcasting said ambient sounds on a specified radio frequency,
    a sound actuated switch responsive to ambient sounds louder than a predetermined level for generating a first control signal for causing said transmitter to broadcast an ambient sounds modulated radio frequency signal,
a receiving unit, said receiving unit including
    a receiver tuned to the radio frequency output of said transmitter, means within said receiver for detecting and converting the ambient sounds contained in said radio frequency signal into an audio output, the improvement comprising in said monitoring unit,
  a tone generator for generating a control audio frequency tone,
  a first switching circuit responsive to said first control signal for applying said control audio frequency tone to said transmitter,
  a first time delay circuit for immediately applying said control audio frequency tone to said transmitter, and for removing said control audio frequency tone a first predetermined time after said first control signal is terminated,
  a second switching circuit for controlling the output of said transmitter, and
  a second time delay circuit responsive to said first control signal and connected to said second switching circuit for turning on said transmitter immediately when said control signal is generated, and for turning off said transmitter a second predetermined time after said control signal is terminated, said second predetermined time being longer than said first predetermined time, in said receiving unit,
  a tone decoder for detecting and converting said control audio frequency tone into a tone detect signal, and
  a clamp circuit responsive to said tone detect signal for muting the audio output of said receiver in the absence of said tone detect signal.

2. The wireless sound monitoring apparatus of claim 1 wherein said control audio frequency tone is in the frequency range of below about 150 Hz.

3. The wireless sound monitoring apparatus of claim 2 wherein said control audio frequency tone is in the frequency range of about 90 to 100 Hz.

4. The wireless sound monitoring apparatus of claim 1 wherein said control audio frequency tone is in a frequency range above 3000 Hz.

5. In a wireless sound monitoring apparatus comprising a monitoring unit, said monitoring unit including
  a microphone for monitoring ambient sounds,
  a transmitter connected to said microphone for broadcasting said ambient sounds on a specified radio frequency,
  a sound actuated switch responsive to ambient sounds louder than a predetermined level for generating a first control signal for causing said transmitter to broadcast an ambient sounds modulated radio frequency signal, a receiving unit, said receiving unit including
  a receiver tuned to the radio frequency output of said transmitter,
  means within said receiver for detecting and converting the ambient sounds contained in said radio frequency signal into an audio output, the improvement comprising in said monitoring unit,
  a tone generator for generating a control audio frequency tone,
  a first switching circuit responsive to said first control signal for applying said control audio frequency tone to said transmitter, and
  a pulse generator for generating control audio frequency tone pulses from said tone generator at regular intervals, each control tone pulse having a predetermined duration, in said receiving unit,
  a tone decoder for detecting and converting said control audio frequency tone into a tone detect signal,
  a clamp circuit responsive to said tone detect signal for muting the audio output of said receiver in the absence of said tone detect signal,
  a delay circuit for delaying the application of said tone detect signal to said clamp circuit by time delay which exceeds the duration of said control tone pulse, and
  alarm means for indicating when said control tone pulses are not received.

6. The wireless sound monitoring apparatus of claim 5 further including, in said receiving unit,
  means for indicating when more than a predetermined number of consecutive control tone pulses are not received by said receiving unit.

7. The wireless sound monitoring apparatus of claim 6 wherein said indicating means includes a distinctive, audible audio frequency tone.

8. The wireless sound monitoring apparatus of claim 7 wherein said alarm means includes an LED, said apparatus further including means for blinking said LED each time a tone pulse is received.

9. In a wireless sound monitoring apparatus comprising a monitoring unit, said monitoring unit including
  a microphone for monitoring ambient sounds,
  a transmitter connected to said microphone for broadcasting said ambient sounds on a specified radio frequency,
  a sound actuated switch responsive to ambient sounds louder than a predetermined level for generating a first control signal,
  a transmit control switch responsive to said first control signal for causing said transmitter to broadcast on said specified radio frequency, a receiving unit, said receiving unit including
  a receiver tuned to the radio frequency of said transmitter, and
  means within said receiver for detecting and converting the ambient sounds contained in said radio frequency signal into an audio output signal, the improvement comprising in said monitoring unit,
  a tone generator for generating a control audio frequency tone,
  a first switching circuit responsive to said first control signal for causing an output from said tone generator to be applied to said transmitter immediately when said first control signal is generated,
  a first delay circuit for removing the output from said tone generator a first predetermined time after said first control signal is terminated,
  a second switching circuit responsive to said first control signal for turning on said transmitter immediately when said first control signal is generated,
  a second delay circuit for turning off said transmitter a second predetermined time after said first control signal is terminated, said second predetermined time being longer than said first predetermined time,
  a pulse generator circuit for providing a second control signal of a predetermined duration at regular intervals directly to said first and said second switching circuits for controlling the operation of both said tone generator and said transmitter without any time delay, in said receiving unit,
a tone decoder for detecting and converting said control audio frequency tone into a tone detect signal,
a clamp circuit for muting the audio output of said receiver in the absence of said tone detect signal, and
a mute delay circuit responsive to said control audio frequency tone for delaying the application of said tone detect signal to said clamp circuit for a predetermined period of time, which is greater than the duration of said second control signal.

10. The sound monitoring system of claim 9 wherein said control audio frequency tone is in a frequency range below about 150 Hz.

11. The sound monitoring apparatus of claim 9 further including
a pulse sensing circuit responsive to said tone control signals for providing a visual output when said tone detect signals are being received at regular intervals.

12. The sound monitoring apparatus of claim 9 further including
means responsive to said tone detect signals for indicating when a predetermined number of consecutive control audio frequency tones are not received by said receiving unit.

13. A wireless sound monitoring apparatus, comprising:
a monitoring unit, said monitoring unit including
a microphone for monitoring ambient sounds,
a transmitter connected to said microphone for broadcasting on a radio frequency signal ambient sounds near the monitoring unit,
a sound actuated switch responsive to ambient sounds louder than a predetermined level for generating a first control signal,
a subaudible tone generator,
control circuit means responsive to said first control signal for turning said transmitter on and for applying an output from said tone generator to said transmitter immediately when said first control signal is generated, and for removing the output from said tone generator before said transmitter is turned off,
means for generating a second control signal of a predetermined duration at regular intervals, and
means responsive to said second control signal for turning said transmitter on and off with an output from said tone generator,
a receiving unit, said receiving unit including
a receiver tuned to the radio frequency of said transmitter,
means within said receiver for detecting and converting the ambient sounds contained in said radio frequency signal into an audio output signal,
a loudspeaker,
a tone detection circuit for providing a tone detect signal in response to the detection of said control audio frequency tone,
a mute circuit connected between said receiver and said loudspeaker and responsive to said tone detect signal for controlling the output of audio from said loudspeaker, and
a delay circuit for delaying the un-muting of said receiver audio from said loudspeaker for a predetermined period of time which is greater than the on-time of said second control signal.

14. A wireless sound monitoring apparatus, comprising:
a monitoring unit to selectively transmit ambient sounds whenever the sound level of the ambient sounds exceeds a predetermined threshold, the monitoring unit including a hidden tone generator that generates a hidden tone to be transmitted with the ambient sounds; and
a receiving unit receptive of transmissions from the monitoring unit to selectively convert the ambient sounds received in the transmissions into sound waves in the vicinity of the receiving unit, the receiving unit including a hidden tone detector to detect hidden tones within the transmission, wherein the receiving unit does not convert the received ambient sounds in each transmission into audible sound waves until a predetermined time period after the beginning of each transmission, wherein the predetermined time period is longer than a time period sufficient for the hidden tone detector to detect a hidden tone, the receiving unit also including a humanly-perceptible indicator to indicate the detection of a hidden tone;
wherein the monitoring unit periodically transmits a brief transmission which is shorter than the predetermined time period, the brief transmission including a hidden tone which is detected by the receiving unit and causing the indicator to indicate the presence of the hidden tone to allow a human in the vicinity of the receiving unit to perceive the indication in order to know that the monitoring apparatus continues to function properly, without causing the receiving unit to convert any ambient sounds in the brief transmission.

15. A method of monitoring sounds from a remote location utilizing a monitoring unit and a receiving unit, comprising the steps of:
transmitting ambient sounds and a hidden tone from the monitoring unit to the receiving unit whenever either the sound level of the ambient sounds exceeds a predetermined threshold or a predetermined time period since the last transmission has been met;
receiving transmissions from the monitoring unit and detecting the presence of the hidden tone;
indicating in a humanly-perceptible form the presence of the hidden tone;
delaying the conversion of the ambient sounds in the transmissions until a predetermined time period after the beginning of the current transmission has elapsed.

* * * * *